United States Patent [19]

Herzog

[11] 4,242,668
[45] Dec. 30, 1980

[54] CART THEFT PREVENTION SYSTEM

[76] Inventor: Walter Herzog, 20338 Bryant St., Canoga Park, Calif. 91306

[21] Appl. No.: 28,042

[22] Filed: Apr. 30, 1979

[51] Int. Cl.³ .................. G08B 1/08; B60R 25/08; B62D 39/00
[52] U.S. Cl. .................. 340/539; 340/51; 340/63; 340/69; 340/552; 340/561; 340/568; 340/694; 280/33.99 C; 455/67
[58] Field of Search .............. 340/539, 532, 551, 552, 340/561, 568, 571, 51, 56, 61, 63, 69, 694, 696; 280/33.99 C, 47.26, DIG. 4; 188/5, 19; 325/29, 64, 67, 111; 455/39, 67, 68, 134, 603

[56] References Cited

U.S. PATENT DOCUMENTS

| | | | |
|---|---|---|---|
| 3,157,871 | 11/1964 | Umanoff | 340/539 |
| 3,394,945 | 7/1968 | Steier et al. | 280/33.99 C |
| 3,652,103 | 3/1972 | Higgs | 280/33.99 C |
| 3,809,202 | 5/1974 | Tyszkiewicz | 280/33.99 C |
| 3,892,295 | 7/1975 | Hahto | 280/33.99 C |

*Primary Examiner*—John W. Caldwell, Sr.
*Assistant Examiner*—Donnie L. Crosland
*Attorney, Agent, or Firm*—John J. Posta, Jr.

[57] ABSTRACT

A shopping cart theft prevention system which includes signal sending means and a receiver carried by the cart for receiving a cart-immobilizing or cart-mobilizing signal from the transmitter. The cart includes a frame and a sub-frame pivoted to the frame and bearing spaced cart-supporting wheels, the sub-frame being connected to the frame by a latch. The latch is opened whenever a signal is received from the transmitter by a receiver attached to the cart. Alternatively, a signal can be sent to keep the latch closed, and upon removal of the signal, the latch can be opened. The cart may carry a battery operated solenoid triggered by the radio signal. The plunger of the solenoid may comprise or activate a crossbar on the latch. Thus, when the solenoid is operated, the crossbar is moved so that the latch is open or closed, allowing the sub-frame and associated wheels to automatically swing out of operative position when open, thereby immobilizing the cart.

14 Claims, 4 Drawing Figures

U.S. Patent     Dec. 30, 1980     4,242,668
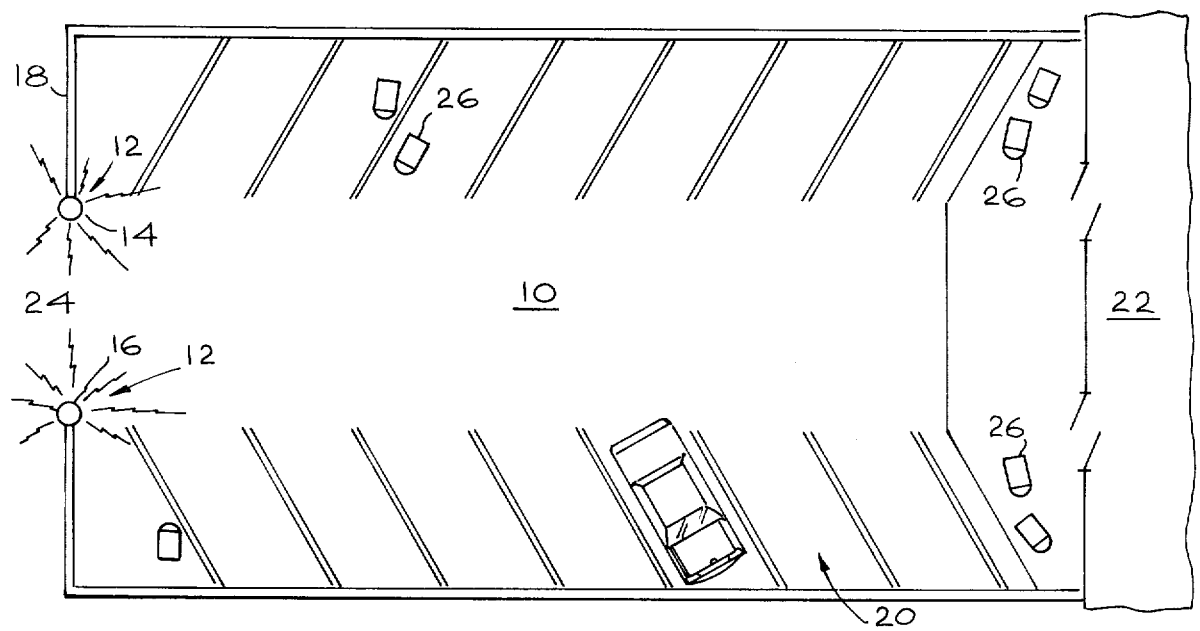
*Fig. 1*
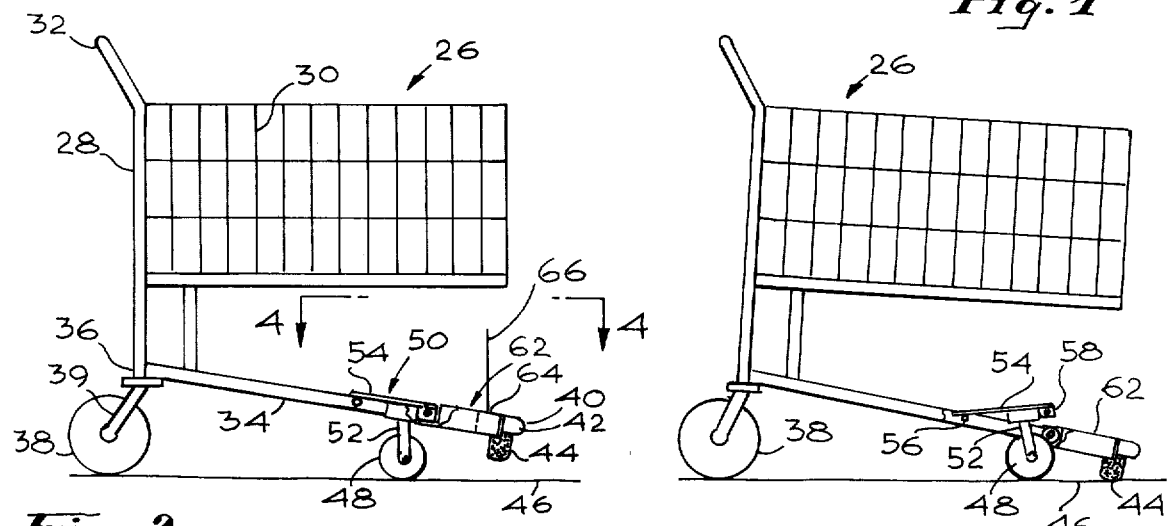
*Fig. 2*     *Fig. 3*
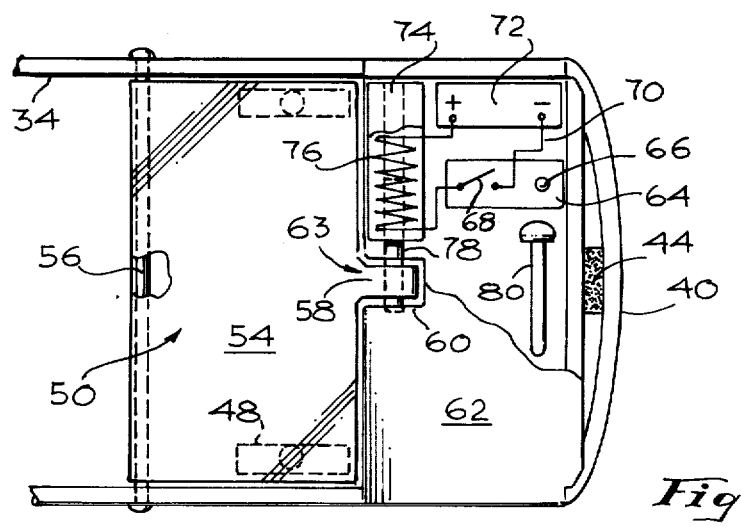
*Fig. 4*

CART THEFT PREVENTION SYSTEM

BACKGROUND OF THE INVENTION

1. Field of the Invention

The present invention generally relates to anti-theft means, and more particularly to an improved system to prevent theft of shopping carts and the like.

Grocery stores, shopping malls and plazas, garden and hardware centers conventionally employ numerous shopping carts to facilitate handling and transportation of goods by customers to and from check-out points and to parked vehicles. Such carts are usually very durably made of relatively expensive materials, such as stainless steel, chrome steel and the like and each may cost up to $30.00 or $40.00 or more. Because of the large number of such carts which may be employed in a single given area, for example, a supermarket grocery store, and the large volume of business which may be conducted during business hours in that area, it is usually relatively simple to remove a cart undetected. In fact, many such carts are stolen each year, such a large number that in some instances the cart thefts represent a very significant factor in the overhead of the business. There exists a need for a simple, inexpensive, effective, preferably automatic system to reduce shopping cart thefts. Such system should be capable of working day or night and be adaptable to a variety of situations. It would also be desirable if such system were effective for industrial use, where cart thefts also occur.

SUMMARY OF THE INVENTION

The foregoing needs have been satisfied by the improved cart theft prevention system of the present invention. The system is substantially as set forth in the Abstract above. Thus, the system includes one or more signal transmitters and one or more carts having signal receivers. Each such cart has one or more cart-supporting wheels secured to a sub-frame pivotally secured to the underside of the frame adjacent one end thereof. The sub-frame is also releasably secured to the frame (at a point spaced from the pivot point) by a latch which automatically opens in response to a signal received by the cart receiver from the transmitter. The latch may include a crossbar passing through aligned openings in the sub-frame and activate the frame or a receiver casing attached to the frame. The radio signal may operate a switch in the cart to complete a circuit through a cart battery so as to power a solenoid to draw the crossbar sufficiently to unlatch the sub-frame, or can utilize equivalent means.

As the cart approaches the transmitter, as at an exit, the signal is received, so that when the latch opens, the sub-frame pivots away from the frame, carrying the attached wheel(s) with it and causing the cart to tip and ground on a bumper or the like. The sub-frame wheels are then automatically moved out of operable alignment and the cart is immobilized, discouraging its further removal. The sub-frame can be easily reset through the use of a key, so as to cause the latch to close and the sub-frame wheels to function again. Thus, the system is simple, inexpensive, durable, efficient and automatic. It functions in all kinds of weather without attendance and discourages would-be cart purloiners without requiring police action or a confrontation with the thief. Further features of the invention are set forth in the following detailed description and accompanying drawings.

In another embodiment, a signal is sent to keep the latch in a closed position. When the cart is moved a significant distance away from the signal source or if the signal is otherwise effectively discontinued, the latch opens to thereby immobilize the cart.

DRAWINGS

FIG. 1 is a schematic diagram depicting a preferred embodiment of the improved cart theft prevention system of the present invention installed in the fenced parking lot of a grocery store;

FIG. 2 schematically depicts in side elevation one of the carts of the system of FIG. 1 in the operative position;

FIG. 3 schematically depicts in side elevation the cart of FIG. 2 in the immobilized position; and FIG. 4 is a schematic sectional view of the cart of FIG. 2, taken along the section line 4—4 of FIG. 2, and partly broken away to illustrate certain internal features.

DETAILED DESCRIPTION

Figure 1

Now referring more particularly to FIG. 1 of the accompanying drawings, a preferred embodiment of the invention is shown installed and in operation in a grocery store parking lot. Thus, system 10 is depicted, which includes at least one and, in this instance, a pair of signal sending means 12. Means 12 preferably are in the form of short range radio signal transmitters 14 and 16 disposed on a fence 18 enclosing a vehicle parking lot 20 next to a grocery store 22. It should be understood that means 12 could be one or more sound transmitters, light transmitters or other signal sending means, if desired, in place on or in addition to radio transmitters 14 and 16.

Fence 18 has an opening 24 which serves as a car exit, and transmitters 14 and 16 border this exit.

System 10 also includes at least one, but preferably (as shown in FIG. 1) a plurality of shopping carts 26, each of which is equipped with means to receive a signal from transmitters 14 and 16 when in close proximity thereto, for example, within about ten feet thereof, and each of which carts 26 include means which, in response to the reception of said signal, automatically immobilize the cart. Thus, any cart 26 which is pushed within, for example, ten feet of exit 24, as would be the case if a thief were to attempt to remove a cart 26 through exit 24, will be immobilized, rendering theft of the cart 26 difficult if not impossible, in any event, at least strongly discouraging such theft.

FIGS. 2, 3 and 4

Now referring more particularly to FIG. 2, it will be seen that cart 26 comprises a frame 28 of metal or the like in the form of an upper open-topped, wire mesh covered package carrying basket 30 with push handle 32, and a lower shelf-like rack 34 secured thereto, the rear end 36 of which rack 31 is attached to a spaced pair of cart-supporting wheels 38, as by struts 39. The front end 40 of rack 34 terminates in a curved (FIG. 4) forwardly projecting curved guard rail 42 and a depending rubber bumper 44. In the operative package-hauling position shown in FIG. 2, bumper 44 is kept well above the level of the ground 46 because of the presence of a forwardly spaced pair of support wheels 48 depending from a sub-frame 50 by struts 52.

Sub-frame 50 is in line with rack 34 and is in the form of a plate 54, the rear end of which is pivotally secured to rack 34 by a transverse crossbar 56 passing through aligned openings in plate 54 and rack 34 (FIG. 4). Now referring more particularly to FIG. 4, the front end of sub-frame 50, specifically plate 54, is in the form of a rectangular tongue 58 which extends forward into an opening 60 in a casing 62 enclosing a radio signal receiver 64 and secured to rack 34 above bumper 44.

In the operative position shown in FIG. 2, plate 54 is parallel to and in line with both rack 34 and casing 62, being held relative to casing 62 by an openable latch 63. In this regard, receiver 64 is provided with an antenna 66 (rising above casing 62) and a switch 68 which automatically responds to a radio signal received by receiver 64 from transmitter 14 or 16 by closing a circuit 70 between a dry cell or storage battery 72 or the like and a solenoid 74. When not in operation, switch 68 is in the open position. The battery 72 thus, with circuit 70 closed, energizes coil 76 of solenoid 74 so that it magnetically draws an iron crossbar 78 toward it through the aligned openings shown in FIG. 4 in tongue 58 and casing 62 a distance sufficient to clear tongue 58 and thus unlatch tongue 58 from casing 62. Thus, crossbar 78, tongue 58 and casing 62 together form latch 63 which is automatically opened by the radio signal from transmitter 14 or 16.

When latch 63 opens, tongue 58 is no longer supported by casing 62, and tongue 58 swings up above casing 62 (FIG. 3), plate 54 pivoting up around bar 56, carrying wheels 48 with it, so that bumper 44 hits the ground 46 and cart 26 is immobilized. Wheels 48 will swing loosely on struts 52 and rotate with plate 54 if the front end of cart 26 is then pivoted up around wheels 38 by handle 32 in an attempt to move cart 26 so that in any event wheels 48 no longer can support cart 26. Although it is possible to maneuver cart 26 with the front end thereof pivoted up so that wheels 48 and bumper 44 do not drag on the ground, the utility of cart 26 is very limited and it is likely that a cart thief would believe that cart 26 somehow has broken and is useless, thereby discouraging its theft. Moreover, anyone wheeling cart 26 solely by wheels 38 would be easily detected.

It reality, all that need be done to restore cart 26 to its original operative condition, as shown in FIG. 2, is to remove cart 26 from the range of the signal from transmitters 14 and 16, and then use key 80 to push or slide crossbar 78 through the previously described aligned openings in tongue 58 and casing 62 to pin tongue 58 in place, with plate 54 in line with rack 34. Wheels 48 will now be in the operative cart-supporting position shown in FIG. 2 and cart 26 will again be ready for use. Thus, system 10 is simple, automatic, inexpensive, durable and effective.

It will be understood that the latch and latch releasing mechanism of the invention can be made in various suitable forms in addition to those previously described. Thus, for example, crossbar 56 could be spring loaded (not shown) and held in the latch closing position by, for example, a hinged strut and detent arrangement (not shown), wherein the strut could be moved from the detent, as by a solenoid, upon actuation thereof by a radio signal or the like, so as to allow the crossbar to spring out of contact with tongue 58. Other arrangements of components are also possible. It will be understood, for example, that the tongue 58 could extend laterally instead of forwardly (not shown) and could be received within a suitable side opening in rack 34 and that latch 63 could be suitably rearranged to accommodate this change.

Likewise, it is apparent that the system could readily be designed to provide for maintainance of the latch in a closed position while the signal is being sent, with opening of the latch and attendant immobilizing of the cart upon effective removal of the signal.

Various other modifications, changes, alterations and additions can be made in the system of the present invention, its components, their parameters and arrangements. All such modifications, changes, alterations and additions as are within the scope of the appended claims form part of the present invention.

What is claimed is:

1. An improved cart theft prevention system, said system comprising, in combination:
   a. signal sending means; and
   b. at least one cart having a signal receiving means secured thereto which is adapted to receive a signal from said sending means while at a distance therefrom, said cart comprising, in combination:
      i. a frame adapted to support and contain a load,
      ii. a sub-frame adjacent said frame and bearing spaced cart-supporting wheels,
      iii. pivot means pivotally securing one end of said sub-frame to said frame, and
      iiii. latch means spaced from said pivot means, secured to said frame and sub-frame and releasably securing said sub-frame to said frame.
   c. said signal receiving means on said cart connected to said latch means and responsive to a signal from said signal sending means, said signal controlling movement of said latch means so as to enable movement of the sub-frame and the wheels on said sub-frame into a cart-immobilizing position.

2. The improved cart theft prevention system of claim 1 wherein said signal sending means is a radio signal transmitter and wherein said cart is a shopping cart.

3. The improved cart theft prevention system of claim 1 wherein said signal sending means is a sound signal emitter.

4. The improved cart theft prevention system of claim 2 wherein said cart bears a storage battery, wherein said sub-frame is disposed under said frame adjacent one end of said cart and wherein said frame bears other cart-supporting wheels spaced from said sub-frame wheels.

5. The improved cart theft prevention system of claim 4 wherein said sub-frame is at the front end of said cart and said pivot means is at the rear end of said sub-frame.

6. The improved cart theft prevention system of claim 5 wherein said sub-frame bears a depending bumper which moves with said sub-frame into contact with the ground when said latch means is released, so as to facilitate said cart immobilization.

7. The improved cart theft prevention system of claim 6 wherein said sub-frame includes a tongue extending from the front end thereof and releasably held by said latch means wherein said cart includes a solenoid, and wherein said latch means includes a metallic crossbar attractable by said solenoid and releasably securing said tongue to said frame.

8. The improved cart theft prevention system of claim 7 wherein said cart includes a battery connected to said solenoid, wherein said radio receiving means is disposed in a case secure to said frame and includes a radio signal activatable switch connected to said battery, and wherein said tongue is releasably pinned to said case by said crossbar.

9. The improved cart theft prevention system of claim 2 wherein said system includes a plurality of said carts and wherein said radio signal sending means is a short range transmitter for use at shopping cart lot exits.

10. The improved cart theft prevention system of claim 9 wherein said sub-frame wheels are concealed by said frame, wherein said shopping cart is of the push cart type, and wherein said pivoting of said sub-frame upon said latch release tilts said sub-frame wheels to an inoperative position.

11. The improved cart theft prevention system of claim 10 wherein said system includes key means for resetting said latch release means to a sub-frame-supporting, wheel-operating position.

12. The improved cart theft prevention system of claim 11 wherein said cart includes a front bumper depending from said frame and engaging the ground when said cart is immobilized.

13. The improved cart prevention system of claim 1 wherein said signal causes said latch means to open.

14. The improved cart prevention system of claim 1 wherein the presence of said signal maintains said latch in a closed position.

* * * * *